March 31, 1942.  I. SICARD  2,278,220
SNOW REMOVING APPARATUS
Filed Dec. 26, 1940  3 Sheets-Sheet 2

INVENTOR
IRENEE SICARD
BY Fetherstonhaugh & Co.
ATTORNEYS

March 31, 1942.　　　I. SICARD　　　2,278,220
SNOW REMOVING APPARATUS
Filed Dec. 26, 1940　　　3 Sheets-Sheet 3
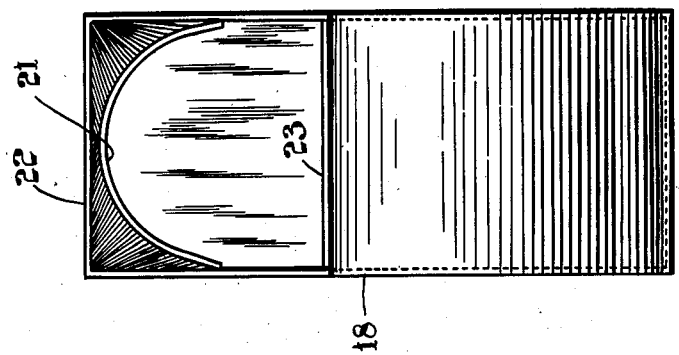
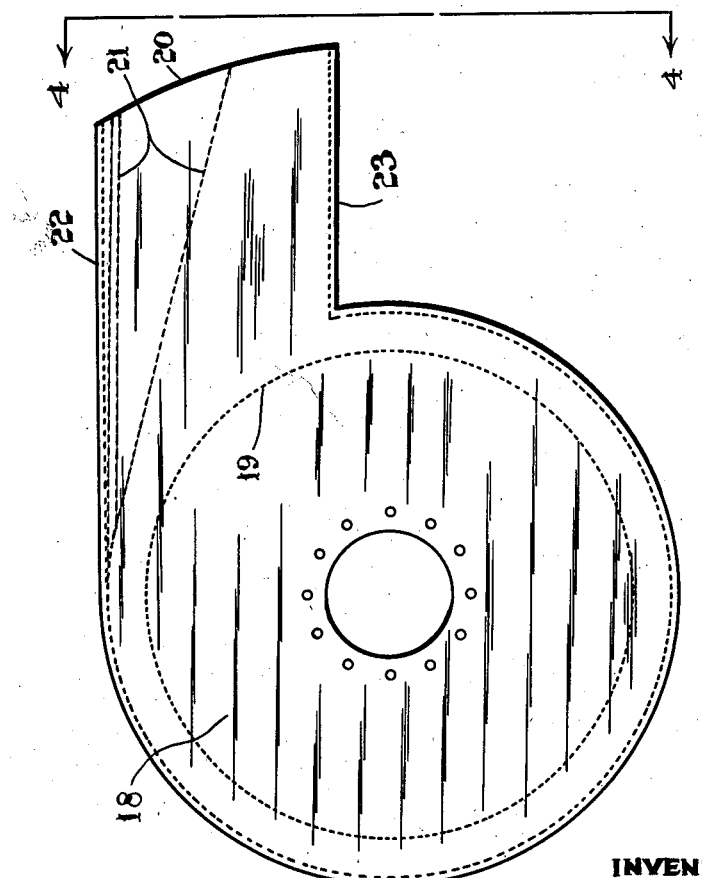
INVENTOR
IRENEE SICARD Patented Mar. 31, 1942

2,278,220

UNITED STATES PATENT OFFICE 2,278,220

SNOW REMOVING APPARATUS

Irenée Sicard, Montreal, Quebec, Canada

Application December 26, 1940, Serial No. 371,716
In Canada November 18, 1940

1 Claim. (Cl. 37—43)

This invention relates to improvements in the type of snow removing apparatus described and claimed in U. S. Patent 2,092,536, dated Sept. 7, 1937.

The snow removing apparatus disclosed in the above mentioned patent comprises upper and lower spiral conveyors journalled in a casing which is open at the front to serve as a scoop. This casing is also provided with a rear opening through which the snow is delivered to a blower having its casing mounted directly behind said rear opening, said casing being provided with a central inlet registering with the rear opening of the scoop casing and with a peripheral outlet, the latter serving to direct the snow toward one side of the roadway.

One object of the present invention is to increase the efficiency of the spiral conveyors employed for feeding the snow to the blower casing. This object is achieved by dividing the casing into an upper compartment containing the upper conveyor and a lower compartment containing the lower conveyor, the two compartments being separated from each other by a partition extending the full width of the casing and across the central portion of the rear casing opening through which the snow is delivered to the blower. This construction enables the upper conveyor to work efficiently without interference by the lower conveyor and vice versa.

Another feature of the invention consists in the provision of a blower casing of improved design.

Proceeding now to a more detailed description reference will be had to the accompanying drawings, wherein.

Fig. 3 is a side elevation of the improved blower casing as it appears when looking toward the side opposite the inlet opening.

Fig. 4 is an end view of the blower casing looking in the direction indicated by the line 4—4 of Fig. 3.

Figure 1:
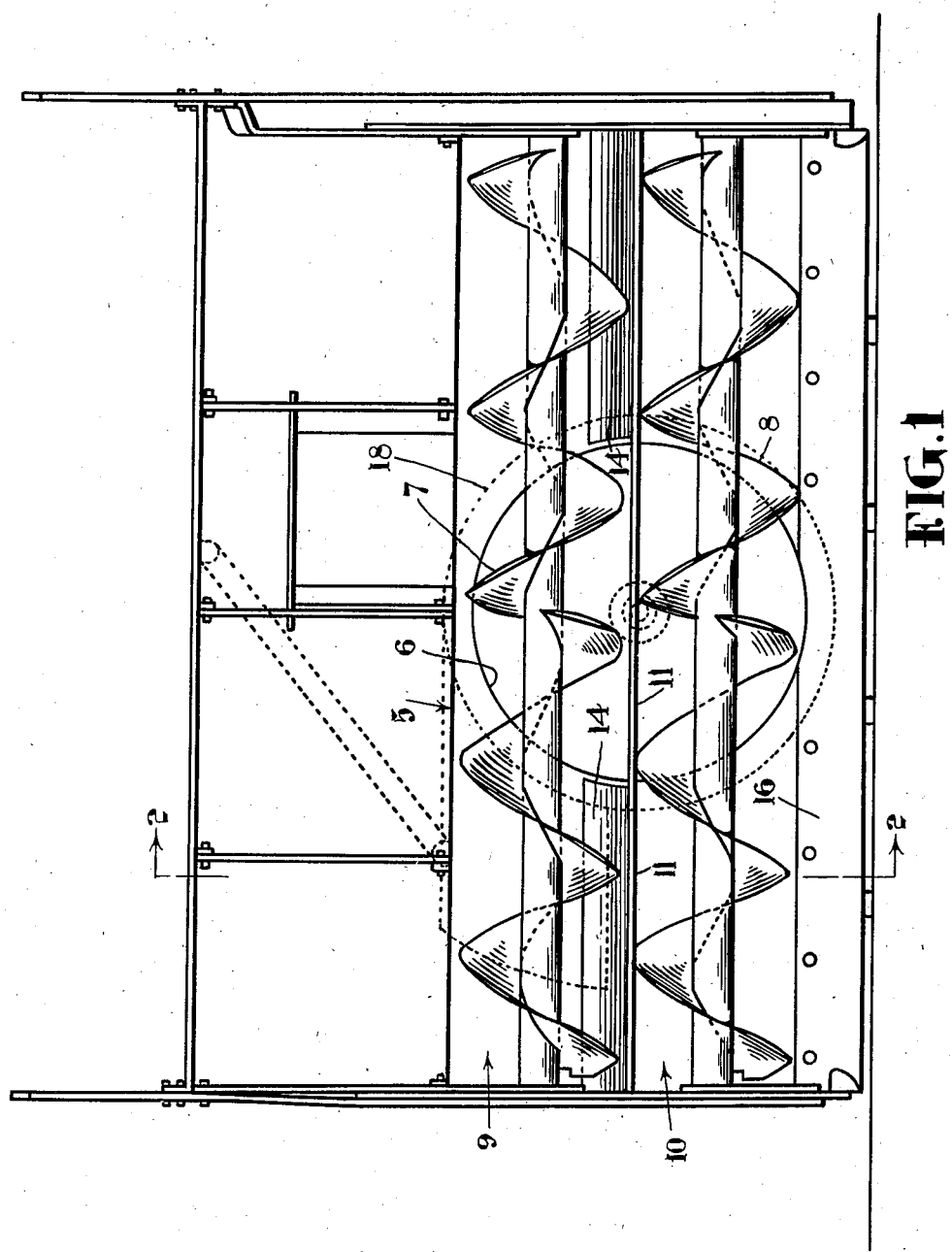
Fig. 1 is a front view of a scoop casing equipped with upper and lower conveyors mounted in separate compartments in accordance with my invention. In this view the blower mounted behind the scoop casing is indicated by dotted lines.
Figure 2:
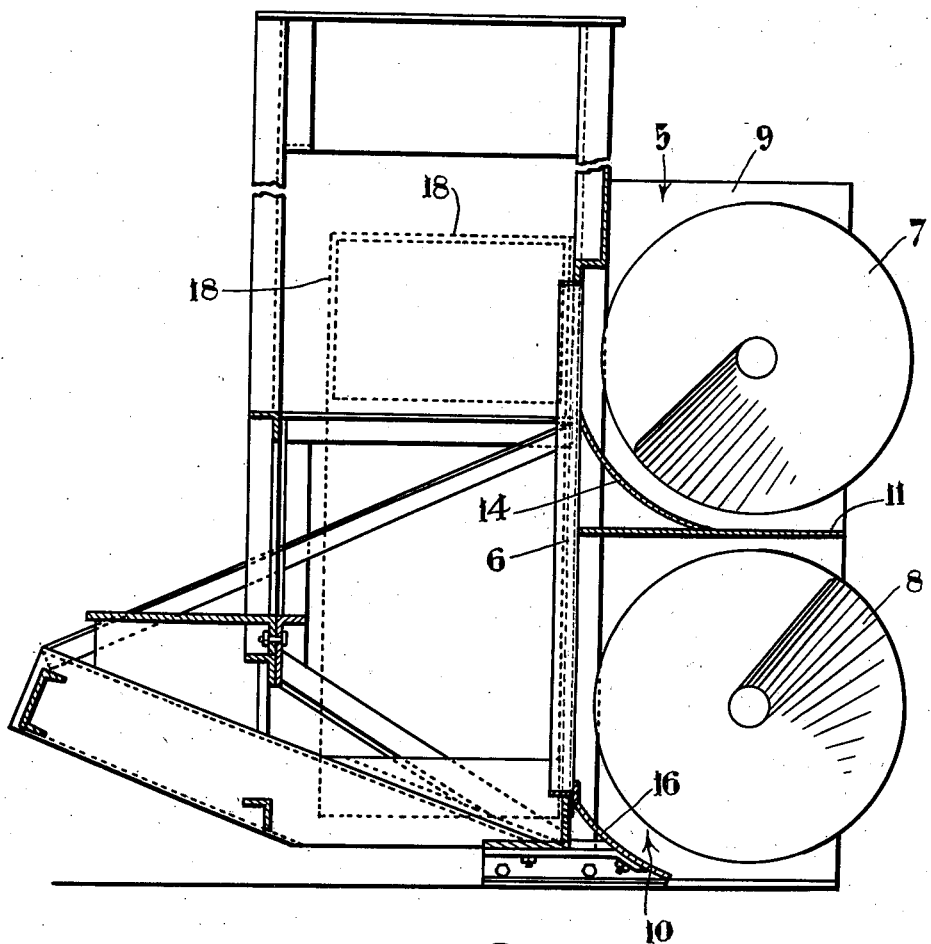
Fig. 2 is a vertical sectional view taken substantially along the line 2—2 of Fig. 1.

Referring to Figs. 1 and 2, 5 designates a scoop casing which serves the same purpose as the scoop casing disclosed in the prior U. S. Patent No. 2,092,536 and which may be supported in a similar manner. This casing is open at the front and top and is provided with a rear opening 6 through which the snow is fed by the upper and lower spiral conveyors 7 and 8, each of said conveyors being provided with right and left hand parts designed to feed snow from the sides toward the centre of the casing.

Casing 5 is divided into upper and lower compartments 9 and 10 by means of a horizontal partition 11 which extends the full width and depth of the casing and across the rear opening 6. Curved plates 14 are arranged in the lower rear portion of compartment 9 at opposite sides of the opening 6. These plates serve as combined guide and bed plates which cooperate with the upper conveyor 7 to facilitate the movement of the snow toward and through the discharge opening 6. In the absence of the plates 14 there would be a tendency for the snow to pack in the lower rear corner portion of the compartment 9. A curved plate 16, similar to the curved plates 14, is arranged in and extends along the lower rear corner portion of the compartment 10. Plate 16 also serves as a scraper which raises the snow toward the lower conveyor 8 as the casing 5 advances along the roadway.

The snow discharged rearwardly through the opening 6 of scoop casing 5 is delivered to a blower whose casing 18 is indicated by dotted lines in Figs. 1 and 2. As shown more particularly in Figs. 3 and 4, the blower casing 18 is provided with a central inlet opening 19 and a tangentially directed peripheral outlet 20. The blower casing 18 is rotatably mounted behind the scoop casing 5 so that the openings 19 and 6 register with one another. The particular method of mounting the blower casing 18 forms no part of the present invention and may be substantially as described in U. S. Patent No. 2,092,536. When mounted as described in said patent the blower casing may be rotated to direct the outlet 20 toward either side of the roadway. For example, the blower casing may be arranged as indicated in Fig. 1, to direct the snow toward one side of the roadway or it may be turned in an anti-clockwise direction through an angle of 180° to position the outlet 20 so as to direct the snow toward the opposite side of the roadway. When the blower casing 18 is positioned as shown in Fig. 1, the snow discharged through the outlet 20 is deflected downwardly by a curved deflector plate 21 which is welded or otherwise secured to the top wall of said outlet, the bottom wall of the outlet being flat as indicated at 23. The deflector plate 21 is transversely curved as shown in Fig. 4 and also has a slight downward inclination toward the exit end of the outlet 20 as clearly indicated by dotted lines in Fig. 3. The curvature of the deflector plate 21 tends to promote the formation of an air envelope surrounding the snow discharged through said outlet 20. In other words, the snow blown through said outlet is concentrated in the form of a centrally located stream surrounded by an envelope of air which is also blown through said passage. The downward inclination of the deflector plate 21 causes the snow to take a downward course as it leaves the exit end of the outlet 20. This, of course, applies only when the blower casing 18 is positioned so that the deflector plate 21 forms the top wall of the outlet 20.

Having thus described my invention, what I claim is:

Snow removing apparatus of the character described comprising a scoop casing provided with a rear discharge opening, a partition extending the full width of said casing and across the central portion of said opening, said partition dividing said casing into separate upper and lower compartments, upper and lower screw conveyors mounted in said compartments to feed snow through the rear opening of the scoop casing, transversely curved plates arranged in the lower rear portion of the upper compartment at opposite sides of said opening and a transversely curved scraper plate arranged in the lower portion of the lower compartment and extending the full width of said casing.

IRENÉE SICARD.